US006779646B2

(12) United States Patent
Wasylciw et al.

(10) Patent No.: US 6,779,646 B2
(45) Date of Patent: Aug. 24, 2004

(54) ORIENTING DISK FOR IMPROVING MAT FORMATION IN COMPOSITE WOOD PRODUCTS

(75) Inventors: Wayne M. Wasylciw, Edmonton (CA); Robert M. Knudson, Coquitlam (CA); Siguo Chen, Edmonton (CA)

(73) Assignee: Forintek Canada Corp. (CA)

( * ) Notice: Subject to any disclaimer, the term of this patent is extended or adjusted under 35 U.S.C. 154(b) by 0 days.

(21) Appl. No.: 10/197,593

(22) Filed: Jul. 18, 2002

(65) Prior Publication Data

US 2004/0011624 A1 Jan. 22, 2004

(51) Int. Cl.[7] ................................................ B65G 47/24

(52) U.S. Cl. ....................................................... 198/382

(58) Field of Search ......................... 198/382; 209/672; 425/81.1–83.1, 110

(56) References Cited

U.S. PATENT DOCUMENTS

| | | | | |
|---|---|---|---|---|
| 3,115,431 A | | 12/1963 | Stokes et al. | |
| 4,380,285 A | | 4/1983 | Bürkner et al. | |
| 4,460,082 A | * | 7/1984 | Burkner ...................... | 198/382 |
| 5,325,954 A | * | 7/1994 | Crittenden et al. ......... | 198/382 |
| 5,404,990 A | * | 4/1995 | Barnes et al. ............... | 198/382 |

* cited by examiner

*Primary Examiner*—Joseph Valenza
(74) *Attorney, Agent, or Firm*—Oyen, Wiggs, Green & Mutala

(57) ABSTRACT

An improved orienting disk is provided for better wood strand alignment in wood strand orienter machinery. The disk has a plurality of fin-like teeth projecting upwardly from the periphery of a generally circular plate. In a preferred embodiment each of the teeth has a straight leading edge facing the direction of rotation of the disk, and a curve trailing edge. Most preferably, the disk has six such teeth, each separated from another by 60° about the periphery of the disk.

5 Claims, 1 Drawing Sheet

ORIENTING DISK FOR IMPROVING MAT FORMATION IN COMPOSITE WOOD PRODUCTS

TECHNICAL FIELD

The present invention relates to machinery used to produce composite wood products, and in particular relates to disks used in rotating disk-type wood strand orienter machinery.

BACKGROUND

Composite wood products such as oriented strand board ("OSB"), particleboard and the like are produced from wood particles or strands. Such strands are generally elongated (longer than they are wide), and it is desirable to have these strands aligned longitudinally and lying flat on the mat when producing OSB. During the manufacturing process, strands of wood are typically formed into mats with the orientation of the wood strands controlled by strand-orienting machinery. Generally, the quality of a composite wood product depends in large part upon how well aligned the wood strands are in the wood strand mat produced by the orienter.

Commonly used strand orienters employ rotating disks. One type of orienter known in the art is the "Stokes" type of orienter, which is described in detail in U.S. Pat. No. 3,115,431, which issued on Dec. 24, 1963 to Stokes et al. This orienter uses a plurality of intermeshed rotating disks mounted on a plurality of substantially parallel shafts oriented in a plane beneath a supply of wood strands. The wood strands are permitted to fall down upon the disks, which, while turning, tend to align the strands longitudinally. The aligned strands fall between the disks to form a mat of strands on a platform or conveyor beneath the disks. The mat is accordingly formed of particles aligned generally longitudinally, although the strands are not perfectly aligned.

Another type of orienter known in the art, which also employs orienting disks, is the type known as the "Bürkner" orienter. The Bürkner orienter is disclosed in U.S. Pat. No. 4,380,285, which issued on 19 Apr., 1983. In the Bürkner orienter, disks on adjacent shafts are arranged in pairs in side-by-side relationship, defining passages for allowing strands of wood to pass through to form a mat.

The disclosures of the aforementioned Stokes and B ürkner patents are incorporated herein by reference.

Over many years, various types and shapes of orienting disks have been used in Stokes and Bürkner orienters to orient wood strands. One type of disk commonly used today is shown in FIG. 1 (the "prior art disk"). This prior art disk has a generally circular shape, with protuberances formed along its periphery. Shallow notches are also cut into the periphery, the notches having a rear edge extending inwardly towards the center of the disk, and a forward edge extending upwardly and forwardly from the bottom of the rear edge, as described in greater detail below.

As discussed earlier, better quality wood composite products can be formed from wood strand mats having a high percentage of strands that are aligned longitudinally as well as lying flat on the mat, and the improved orienting disk of the present invention provides better strand alignment than the prior art disk.

SUMMARY OF INVENTION

The present invention provides an improved orienting disk for use in a wood strand orienter. In one embodiment of the invention the orienting disk comprises a plate having a generally circular shape and an outer periphery. An aperture is formed through the center of the plate for allowing the plate to be fitted onto a shaft in the wood strand orienter for rotation in a first direction about a rotation axis. A plurality of fin-shaped teeth extend outwardly from the periphery of the plate.

Each one of the teeth has a leading edge extending outwardly from the periphery of the plate to a tip of the tooth, the leading edge facing the first direction of rotation when the disk is fitted onto the shaft; and a trailing edge trailing rearwardly and downwardly from the tip of the tooth to the periphery of the plate.

In another embodiment of the invention, the fin-shaped teeth number between two and eight and are evenly spaced about the periphery of the plate. In yet another embodiment, there are six fin-shaped teeth, and each one of the teeth is separated from another by 60° about the periphery of the plate.

The leading and trailing edges can be straight or curved, but in a preferred embodiment, the leading edge is straight, and the trailing edge is curved.

In another preferred embodiment, protuberances are formed about the periphery of the disk, between the fin-shaped teeth.

BRIEF DESCRIPTION OF DRAWINGS

In the accompanying drawings which illustrate specific embodiments of the invention, but which should not be construed as restricting the spirit or scope of the invention in any way.

DESCRIPTION

Throughout the following description, specific details are set forth in order to provide a more thorough understanding of the invention. However, the invention may be practised without these particulars. In other instances, well known elements have not been shown or described in detail to avoid unnecessarily obscuring the invention. Accordingly, the specification and drawings are to be regarded in an illustrative, rather than a restrictive, sense.

Figure 1:
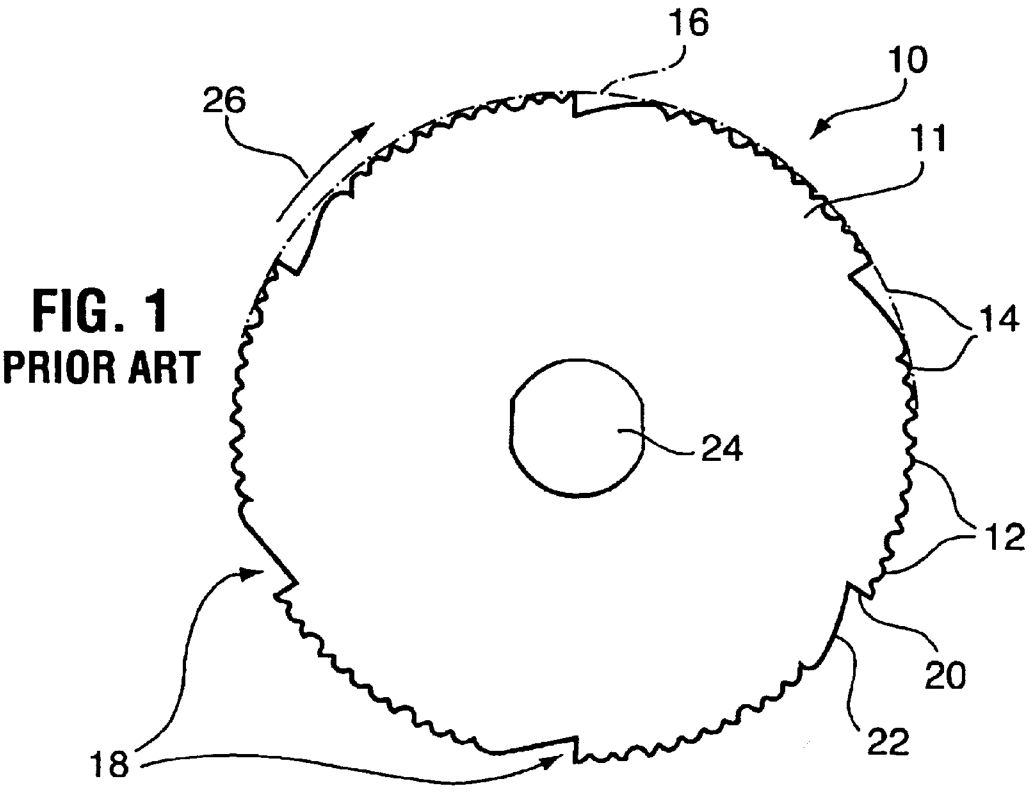
FIG. 1 PRIOR ART
FIG. 1 is side view of a prior art strand-orienting disk used in a typical rotating disk-type strand orienter.

Referring first to FIG. 1, a common prior art orienting disk 10 used in both Stokes and Bürkner wood strand orienters is a plate 11 of generally circular shape, with a plurality of protuberances 12 formed along the circular periphery 14 thereof. "Periphery", as that word is used throughout this description, refers not to the actual outer edge of plate 11, but rather to that circular imaginary line (shown partially by dashed line 16 in FIG. 1) which bounds the generally circular outer edge of plate 11. "Periphery" has a similar meaning when the invention is described below.

In prior art disk 10, a plurality of shallow notches 18 are cut into plate 11 from periphery 14. Each of notches 18 has a short rear edge 20 extending inwardly towards the center of disk 10, and a longer forward edge 22 extending upwardly and forwardly from the bottom of rear edge 20 to periphery 14.

Disk 10 has an aperture 24 formed through the center thereof for mounting disk 10 onto a shaft (not shown) in a wood strand orienter in a manner known in the art. Disk 10 is intended to be rotated in the direction indicated by arrow 26.

Figure 2:
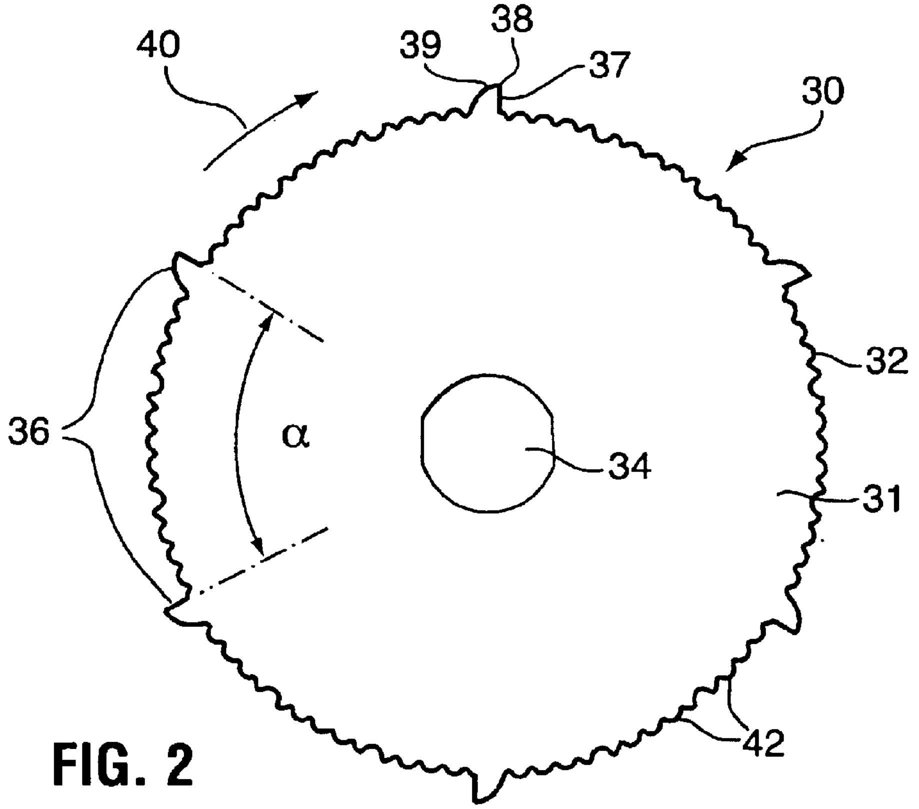
FIG. 2 is side view of a strand-orienting disk made in accordance with the preferred embodiment of the invention.

FIG. 2 illustrates one embodiment of the improved orienter disk of the present invention. In this embodiment, disk 30 is a plate 31 having a generally circular shape and an outer circular periphery 32. Improved disk 30 also has an aperture 34 for mounting disk 30 onto a shaft in a wood strand orienter.

Disk 30 has a plurality of fin-like teeth 36 which extend outwardly from the periphery 32 of plate 31. Each one of teeth 36 has a leading edge 37 extending outwardly from periphery 32 of plate 31 to a tip 38 of tooth 36. Leading edges 37 face the direction of rotation of disk 30, as indicated by arrow 40. Each tooth 36 also a trailing edge 39 trailing rearwardly and downwardly from tip 38 of tooth 36 to periphery 32 of plate 31.

It is not essential to the invention that any particular number of teeth 36 be employed by disk 30. However, it has been determined that too great a number will not allow wood strands to be well aligned by disk 30, and accordingly, the inventors believe that a disk 30 having between two and eight teeth will be most desired. In preferred embodiments, the teeth 36 are evenly spaced about periphery 32 of plate 31, and in the most preferred embodiment (shown in FIG. 2), disk 30 has six teeth 36, each of which is separated from an adjacent tooth by an angle, α, of 60° about said periphery of plate 31.

In one embodiment of the invention, leading edge 37 is straight and trailing edge 39 is curved, as shown in FIG. 2. Further, protuberances 42 may be formed about periphery 32 of plate 31, between fin-shaped teeth 36.

The benefits of the improved orienting disk of the present invention are illustrated by the following experimental results:

Tests were carried out on the Alberta Research Council (ARC) pilot plant Oriented Strand Board (OSB) forming line comparing the performance of the wood strand orienter using the improved orienting disks to the performance of the orienter with a standard commercial design of orienting disk (the prior art disk). Except for the orienting disks, there were no differences between the orienter set-ups for the comparative tests. The ARC pilot plant orienting system is typical of commercial OSB strand orienters except that the ARC pilot plant orienter has four shafts of rotating disks, whereas commercial orienters typically have about 12 shafts of rotating disks.

Tests were carried out using a Stokes type of orienter arrangement and also using a Bürkner type of disk arrangement as well. It was found that results for the two types of orienter disk arrangements were similar. Only the results of the Stokes type of disk arrangement are reported here for simplicity.

The following test variables were included in the study:

| | |
|---|---|
| Disk type: | 1) Prior art disk design used in commercial orienters with small notches on the periphery of the disk (FIG. 1 disk).<br>2) Improved disk design (FIG. 2 disk) |
| Disk spacing: | 1) A common mill spacing of 2 inches (50 mm) between disks on adjacent orienter shafts<br>2) A narrower spacing of 1.5 inches (38 mm) between disks on adjacent orienter shafts |
| Disk speed: | 1) Constant 30 RPM for all orienter shafts<br>2) Low acceleration between orienter shafts (consecutive shaft speeds of 10, 20, 30 and 40 RPM)<br>3) High acceleration between orienter shafts (consecutive shaft speeds of 15, 30, 45 and 60 RPM). |
| Strand flow rate: | 1) Low flow rate (typical mill flow rate).<br>2) Medium flow rate (1.5 times typical mill flow rate)<br>3) High flow rate (2 times typical mill flow rate). |

The following conditions were held constant for all tests.

| | |
|---|---|
| Strands: | Screened mill-produced strands to represent typical face quality strands used throughout the study. Strands were not recycled. |
| Line speed: | Constant setting of 30 Hz.<br>Orienter height above mat: 2 inches (50 mm). |
| Replicates: | Three per test condition. |

In the first test, the improved disk was compared to the prior art disk using both a normal and narrow disk spacing as defined above. The following parameters were measured, determined or calculated:

1. The average and median orientation angles of the wood strands in the wood strand mat.
2. The predicted "modulus of elasticity" (MOE) of the end product.
3. The percentage of strands having an orientation angle of less than 20°.
4. The "% error"- this is an indication of the smoothness of the mat, as discussed below.
5. The "% overs"- the percentage of wood strands which "bridged" the disks, being carried over all of them to the end of the orienter without being aligned and without falling to the strand mat.

Results of the first tests are summarized in Table 1:

TABLE 1

Orientation Study Results[1].

| Disk Type | Disk Spacing | Statistic | Average Orientation Angle, ° | Median Orientation Angle, ° | MOE, % of Max. | % of Strands <20° | % Error | % Overs |
|---|---|---|---|---|---|---|---|---|
| Prior art | Normal | Mean | 33.1 | 25.0 | 32.6 | 32.3 | 26.0 | 3.39 |
| | | St. Dev. | 2.7 | 3.4 | 3.7 | 6.0 | 3.1 | 0.74 |
| Prior art | Narrow | Mean | 27.7 | 18.5 | 39.9 | 43.3 | 9.7 | 8.23 |
| | | St. Dev. | 1.9 | 2.6 | 3.4 | 4.9 | 2.4 | 1.26 |
| Improved | Normal | Mean | 29.4 | 20.9 | 37.0 | 39.2 | 10.1 | 3.33 |
| | | St. Dev. | 2.5 | 3.2 | 4.8 | 5.9 | 1.7 | 0.85 |

TABLE 1-continued

Orientation Study Results[1].

| Disk Type | Disk Spacing | Statistic | Average Orientation Angle, ° | Median Orientation Angle, ° | MOE, % of Max. | % of Strands <20° | % Error | % Overs |
|---|---|---|---|---|---|---|---|---|
| Improved | Narrow | Mean | 28.8 | 20.2 | 37.9 | 40.1 | 9.6 | 7.41 |
| | | St. Dev. | 2.1 | 2.8 | 3.1 | 4.8 | 2.2 | 1.04 |

[1]Twenty seven (27) samples per test cell.

As expected, the narrower disk spacing gave lower mean and median orientation angles, a higher predicted modulus of elasticity (MOE) and a higher incidence of strands with <20° orientation angle. The trends for these measures of orientation were similar for the prior art and improved orienting disk configurations at the same orienter disk spacings.

Where the improved orienting disk design differed from the prior art orientation disk design was in smoothness of the mat at the normal disk spacing. The improved orienting disks produced a much smoother strand mat than the prior art disks as evidenced by a much lower incidence of error readings from a laser strand orientation measurement system used to measure flatness of the resultant mat (10.1% vs 26.0% of instrument readings) as shown in Table 1. Strands that are not lying sufficiently flat in the furnish mat do not produce a regular ellipse with the laser orientation measurement system and cause an error reading in the system. The incidence of error readings with narrow disk spacing was similar for the improved (9.6%) and prior art orienting disks (9.7%).

A smoother strand mat is advantageous for several reasons. Strands falling onto an uneven, partially formed strand mat will have a greater probability of becoming less well oriented. Thus the final strand mat produced from multiple layers of uneven strands will tend to have poorer overall orientation than one produced from multiple layers of even strands. An uneven strand mat will have lower bulk density, resulting in a thicker strand mat, which will require greater press daylight and require more time for the press to close to thickness. More strand breakage during press closing would be expected with an uneven strand mat with many strands sticking up out of the mat. Broken strands reduce product strength. It is postulated that the fin-like teeth on the improved orienting disks help to control the flow of strands down to the mat, resulting in a smoother strand mat.

The difference in the % overs (strands bridging the orienter disks and carried over the orienter) between the improved disks (7.41%) and prior art disks (8.23%) with narrow disk spacing was significant at the 95% confidence level. It would appear that the improved disks help to reduce the amount of strands bridging the orienter disks.

Table 2 contains results of statistical t-tests comparing the different variables in Table 1 to indicate which ones were statistically significant:

TABLE 2

Results of Statistical t-tests comparing test variables.

| Orienter Configurations Compared | Variable Measured | Value 1 | Value 2 | Statistical Significance[1] |
|---|---|---|---|---|
| Prior art Disks/Normal Spacing | Average Angle, ° | 33.1 | 27.7 | *** |
| vs | Median Angle, ° | 25.0 | 18.5 | *** |
| Prior art Disks/Narrow Spacing | MOE, % of Max. | 32.6 | 39.9 | *** |
| | % Strands <20° | 32.3 | 43.3 | *** |
| | % Error | 26.0 | 9.7 | *** |
| | % Overs | 3.39 | 8.23 | *** |
| Improved Disks/Normal Spacing | Average Angle, ° | 29.4 | 28.8 | NS |
| vs | Median Angle, ° | 20.9 | 20.2 | NS |
| Improved Disks/Narrow Spacing | MOE, % of Max. | 37.0 | 37.9 | NS |
| | % Strands <20° | 39.2 | 40.1 | NS |
| | % Error | 10.1 | 9.6 | NS |
| | % Overs | 3.33 | 7.41 | *** |
| Prior art Disks/Normal Spacing | Average Angle, ° | 33.1 | 29.4 | *** |
| vs | Median Angle, ° | 25.0 | 20.9 | *** |
| Improved Disks/Normal Spacing | MOE, % of Max. | 32.6 | 37.0 | ** |
| | % Strands <20° | 32.3 | 39.2 | *** |
| | % Error | 26.0 | 10.1 | *** |
| | % Overs | 3.39 | 3.33 | NS |
| Prior art Disks/Normal Spacing | Average Angle, ° | 33.1 | 28.8 | *** |
| vs | Median Angle, ° | 25.0 | 20.2 | *** |
| Improved Disks/Narrow Spacing | MOE, % of Max. | 32.6 | 37.9 | *** |
| | % Strands <20° | 32.3 | 40.1 | *** |
| | % Error | 26.0 | 9.6 | *** |
| | % Overs | 3.39 | 7.41 | *** |

TABLE 2-continued

Results of Statistical t-tests comparing test variables.

| Orienter Configurations Compared | Variable Measured | Value 1 | Value 2 | Statistical Significance[1] |
|---|---|---|---|---|
| Prior art Disks/Narrow Spacing | Average Angle, ° | 27.7 | 28.8 | * |
| vs | Median Angle, ° | 18.5 | 20.2 | * |
| Improved Disks/Narrow Spacing | MOE, % of Max. | 39.9 | 37.9 | * |
| | % Strands <20° | 43.3 | 40.1 | * |
| | % Error | 9.7 | 9.6 | NS |
| | % Overs | 8.23 | 7.41 | * |

[1]NS difference not significant; * = difference significant at 95% confidence level;  = difference significant at 99% confidence level; * = difference significant at 99.9% confidence level Table 3 indicates that strand flow rate had little effect on any of the parameters measured, with the possible exception of % error. With narrow disk spacing the improved disks, and possibly the prior art disks, appeared to show a trend toward a flatter mat (lower % error) as the strand flow rate increased.

TABLE 3

Effect of strand flow rate on performance of the different orienter types[1].

| Disk Type | Disk Spacing | Strand Flow Rate | Average Orient. Angle, ° | Median Orient. Angle, ° | MOE, % of Max. | % of Strands <20° | % Error | % Overs |
|---|---|---|---|---|---|---|---|---|
| Prior | Normal | Low | 32.8 | 24.5 | 32.8 | 33.4 | 25.4 | 3.22 |
| art | | | 3.1 | 3.6 | 3.7 | 6.6 | 3.4 | 0.50 |
| Prior | " | Medium | 33.2 | 24.5 | 32.5 | 31.9 | 25.9 | 3.58 |
| art | | | 2.4 | 3.7 | 4.8 | 7.4 | 2.0 | 0.86 |
| Prior | " | High | 33.4 | 25.8 | 32.4 | 31.7 | 26.7 | 3.38 |
| art | | | 2.9 | 3.1 | 2.8 | 4.1 | 3.7 | 0.85 |
| Prior | Narrow | Low | 27.5 | 19.1 | 38.8 | 42.8 | 11.4 | 8.33 |
| art | | | 2.0 | 3.0 | 4.0 | 5.6 | 1.4 | 1.27 |
| Prior | " | Medium | 27.7 | 18.0 | 40.2 | 43.7 | 8.0 | 8.74 |
| art | | | 1.0 | 0.7 | 2.2 | 2.0 | 1.6 | 1.11 |
| Prior | " | High | 27.9 | 18.2 | 40.7 | 43.5 | 9.6 | 7.62 |
| art | | | 2.4 | 3.3 | 3.9 | 6.5 | 2.8 | 1.26 |
| Im- | Normal | Low | 31.0 | 22.8 | 34.6 | 35.6 | 10.6 | 3.21 |
| proved | | | 2.5 | 3.5 | 3.6 | 6.0 | 2.1 | 0.99 |
| Im- | " | Medium | 28.2 | 18.8 | 39.1 | 43.6 | 9.9 | 3.68 |
| proved | | | 1.6 | 1.6 | 5.7 | 2.9 | 1.7 | 0.85 |
| Im- | " | High | 28.9 | 20.8 | 37.2 | 38.7 | 9.9 | 3.09 |
| proved | | | 2.4 | 3.2 | 4.2 | 5.5 | 1.3 | 0.67 |
| Im- | Narrow | Low | 28.6 | 19.6 | 38.5 | 41.3 | 11.1 | 6.50 |
| proved | | | 1.6 | 2.4 | 2.6 | 4.0 | 1.4 | 0.87 |
| Im- | " | Medium | 29.5 | 21.7 | 36.6 | 37.7 | 8.6 | 7.59 |
| proved | | | 1.9 | 2.1 | 2.5 | 4.6 | 1.3 | 0.73 |
| Im- | " | High | 28.3 | 19.2 | 38.7 | 41.2 | 8.9 | 8.13 |
| proved | | | 2.6 | 3.2 | 3.9 | 5.3 | 2.8 | 0.80 |

[1]Nine (9) samples per test cell. The top number given in each cell is the mean value and the bottom number is the standard deviation.

Table 4 indicates that disk speed had little effect on any of the parameters measured, with the possible exception of % overs, which is the percentage of strands bridging the orienter disks and carried across the top of the orienter without falling through the orienter. For both the prior art disks and improved disks with normal spacing, the % overs appeared to increase as the orienter disk speed was accelerated from one bank of disks to the next. With narrow disk spacing there was no apparent trend for the % overs to increase with increasing orienter disk acceleration for either the prior art disks or the improved disks.

TABLE 4

Effect of orienter disk speed on performance of the different orienter types[1].

| Disk Type | Disk Spacing | Orienter Disk Speed | Average Orient. Angle, ° | Median Orient. Angle, ° | MOE, % of Max. | % of Strands <20° | % Error | % Overs |
|---|---|---|---|---|---|---|---|---|
| Prior | Normal | Constant | 34.5 | 26.6 | 30.6 | 30.3 | 25.1 | 2.81 |
| art | | | 2.0 | 2.8 | 3.1 | 5.4 | 2.5 | 0.20 |
| Prior | " | Low | 32.0 | 23.9 | 33.4 | 33.7 | 25.2 | 3.16 |
| art | | Accel. | 2.7 | 3.2 | 4.1 | 6.6 | 3.7 | 0.28 |
| Prior | " | High | 33.0 | 24.4 | 33.7 | 33.0 | 27.6 | 4.21 |
| art | | Accel. | 2.9 | 3.8 | 3.4 | 6.1 | 2.5 | 0.69 |
| Prior | Narrow | Constant | 27.8 | 18.6 | 39.5 | 42.8 | 10.4 | 8.27 |
| art | | | 2.3 | 2.7 | 3.6 | 5.5 | 2.2 | 1.50 |
| Prior | " | Low | 25.2 | 16.6 | 37.1 | 40.7 | 9.0 | 8.00 |
| art | | Accel. | 2.2 | 3.5 | 4.0 | 6.3 | 2.6 | 1.39 |
| Prior | " | High | 27.9 | 18.9 | 39.7 | 42.8 | 9.0 | 7.73 |
| art | | Accel. | 1.1 | 1.3 | 2.8 | 2.3 | 2.3 | 0.68 |
| Im- | Normal | Constant | 29.6 | 20.8 | 38.3 | 40.0 | 10.5 | 2.54 |
| proved | | | 2.7 | 3.2 | 3.2 | 4.2 | 1.7 | 0.30 |
| Im- | " | Low | 30.0 | 21.9 | 34.6 | 37.1 | 10.6 | 3.18 |
| proved | | Accel. | 3.0 | 3.9 | 5.6 | 7.1 | 1.5 | 0.54 |
| Im- | " | High | 28.7 | 20.1 | 38.0 | 40.1 | 9.4 | 4.26 |
| proved | | Accel. | 1.7 | 2.8 | 4.9 | 6.3 | 1.8 | 0.54 |
| Im- | Narrow | Constant | 27.9 | 19.3 | 38.3 | 40.6 | 11.2 | 7.35 |
| proved | | | 2.0 | 2.6 | 2.9 | 5.7 | 1.4 | 0.36 |
| Im- | " | Low | 27.2 | 19.5 | 34.1 | 36.4 | 7.9 | 6.67 |
| proved | | Accel. | 2.4 | 3.4 | 4.1 | 5.8 | 2.2 | 1.23 |
| Im- | " | High | 28.6 | 19.7 | 38.4 | 40.3 | 9.3 | 7.58 |
| proved | | Accel. | 1.3 | 1.9 | 2.3 | 2.9 | 2.0 | 1.34 |

[1]Nine (9) samples per test cell. The top number given in each cell is the mean value and the bottom number is the standard deviation.

It will be clear to those skilled in the art from these experimental data that the improved disk improves strand formation in orienters.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An orienting disk for use in a wood strand orienter, said orienting disk comprising:

a) a plate having a generally circular shape and an outer periphery, said outer periphery having a generally constant radius as measured from the center of said plate;

b) an aperture formed through the center of said plate for allowing said plate to be fitted onto a shaft in said wood strand orienter for rotation in a first direction about a rotation axis; and c) a plurality of fin-shaped teeth extending outwardly from said periphery of said plate, each tooth occupying a distance along said periphery and each one of said teeth comprising:

i) a leading edge extending upwardly from said periphery of said plate to a tip of said tooth, said leading edge facing said first direction of rotation when said disk is fitted onto said shaft; and ii) a trailing edge trailing rearwardly and downwardly from said tip of said tooth to said periphery of said plate;

said plate further comprising protuberances formed about said outer periphery bwteen said teeth.

2. The orienting disk claimed in claim 1, wherein said fin-shaped teeth are evenly spaced about said periphery of said plate and number between two and eight.

3. The orienting disk claimed in claim 2 wherein said fin-shaped teeth number six and wherein each one of said teeth is separated from another by 60° about said periphery of said plate.

4. The orienting disk claimed in claim 3 wherein said leading edge is straight and said trailing edge is curved.

5. The orienting disk claimed in claim 1 wherein the distance along said periphery between adjacent pairs of said teeth is greater than said distance occupied by each tooth.

* * * * *